United States Patent [19]

Huguenard et al.

[11] 3,987,232

[45] Oct. 19, 1976

[54] MAGNETIC RECORDING MATERIALS HAVING GREAT RESISTANCE TO WEAR AND TEAR

[75] Inventors: Albert P. Huguenard; Yves P. M. Etienne; Charles A. R. Magallon, all of Vincennes, France

[73] Assignee: Eastman Kodak Company, Rochester, N.Y.

[22] Filed: Mar. 15, 1973

[21] Appl. No.: 341,633

Related U.S. Application Data

[63] Continuation-in-part of Ser. No. 134,833, April 16, 1971, abandoned.

[52] U.S. Cl. .................................. 428/539; 428/900
[51] Int. Cl.² .............................................. H01F 10/02
[58] Field of Search .......................... 117/235–240; 252/62.54, 56 R, 56 S; 428/539, 900

[56] References Cited
UNITED STATES PATENTS

| | | | |
|---|---|---|---|
| 2,718,504 | 9/1955 | Bartlett | 252/56 |
| 2,758,975 | 8/1956 | Cottle | 260/29.1 X |
| 2,821,538 | 1/1958 | Dille et al. | 252/56 |
| 2,991,198 | 7/1961 | Abeck et al. | 117/138.8 X |
| 3,179,533 | 4/1965 | Rusch | 117/140 X |
| 3,274,111 | 9/1966 | Sada et al. | 117/121 X |
| 3,324,070 | 6/1967 | Hostettler et al. | 260/874 X |
| 3,325,339 | 6/1967 | McBournie et al. | 117/236 X |
| 3,387,993 | 6/1968 | Flowers | 117/235 |
| 3,470,021 | 9/1969 | Hendricx et al. | 117/235 |
| 3,492,235 | 1/1970 | Matsumoto et al. | 117/235 X |
| 3,523,086 | 8/1970 | Bisschops et al. | 117/235 |
| 3,542,589 | 11/1970 | Hartmann et al. | 117/235 |
| 3,547,693 | 12/1970 | Huguenard | 117/235 |

FOREIGN PATENTS OR APPLICATIONS

| | | |
|---|---|---|
| 907,637 | 10/1962 | United Kingdom |
| 870,570 | 6/1961 | United Kingdom |

*Primary Examiner*—Bernard D. Pianalto
*Attorney, Agent, or Firm*—B. D. Wiese

[57] ABSTRACT

A magnetic recording element having greatly improved resistance to wear and tear is disclosed. This element includes in a magnetizable layer a carbonic acid ester lubricant such as ethyl cetyl carbonate, ethyl lauryl carbonate, didodecyl carbonate or phenyl cetyl carbonate. The lubricant can be present in an amount between 1 and 40% by weight of the binder, and advantageously about 20%. A typical binder is a copolymer of vinyl chloride with vinyl acetate, with or without polyurethane.

6 Claims, No Drawings

MAGNETIC RECORDING MATERIALS HAVING GREAT RESISTANCE TO WEAR AND TEAR

This application is a continuation-in-part of copending U.S. application Ser. No. 134,833, filed Apr. 16, 1971 now abandoned.

BACKGROUND OF THE INVENTION

1. Field of the Invention

The present invention relates to an element for magnetic recording having a great resistance to wear and tear and, more particularly, to the use of a new class of compounds as lubricants for said elements.

2. The Prior Art

Elements used for magnetic recording most often comprise a non-magnetizable support to which is applied a layer of magnetizable particles dispersed in a binder usually comprising a synthetic resin.

It is known that in magnetic recording, and more particularly in the case of high density information storage, the magnetic heads must be in close contact with the magnetizable layer. As a result, phenomena occur that are connected with friction which can result in a more or less extensive change of the layer. An often observed mechanism consists in a tearing of material which, by accumulating on the head or heads, or by transferring to the surface of the tape, causes a weakening or even the disappearance of the signal.

These phenomena are particularly sensitive in the case of tapes that serve as memories in data processing and of tapes designed for video recording, due to the relatively high speeds between the heads and the magnetic layer and to the particular requirements connected with these types of usages.

A particularly strict test of magnetic tapes involves certain equipment for the recording and copying of images, wherein the track is scanned helically. Equipment of this type currently used in closed-circuit television broadcasting, and particularly in educational broadcasting, offers the possibility of still frame reading by immobilizing the tape while the head continues its scanning, so that it is always the same image being projected. Under these conditions, a small portion of the tape is subjected to wear and tear corresponding to several thousand passages per minute and the result is, in the case of an ordinary tape, a rapid deterioration of the layer with disappearance of the image.

Numerous solid lubricants have been suggested for extending the useful life of the tapes, e.g. graphite and molybdenum disulfide, but these give disappointing results in that only small amounts can be used without reducing the quality of the magnetic signal. The silicones, such as described in French patent No. 1,032,730, make it possible to improve resistance to abrasion in certain particular cases, but their efficiency is reduced when the relative speed of head and tape is high, particularly in the recording of images. The fatty acid esters of monoalcohols such as described in U.S. Pat. No. 3,274,111 constitute a class of outstanding lubricants, particularly for the recording of images, but certain difficulties in connection with the exudation of the lubricant can appear as is indicated in said patent. This exudation phenomenon results, in general, from the fact that many commercial esters, of fatty acids used in the manufacture of these esters, are formed by the mixture of different homologs that are difficult to separate, e.g. myristates, palmitates, stearates, and if, at the temperature that is used, some are liquid and some are solid, the first assist migration to the surface of the second, causing the observed formation of solid deposits.

In view of the foregoing, it should be obvious that the result achieved when a given material is used as a lubricant in a magnetic recording layer is both unpredictable and empirical in nature. This is further illustrated by Example 6 which follows.

Accordingly, it is an object of the present invention to remedy disadvantages obtained with the afore-cited lubricants, and to provide a new class of compounds useful as lubricants for magnetic recording elements and, more particularly, to provide a tape for magnetic recording having an improved resistance to wear and tear and thus a longer useful lifetime. Other objects of this invention will become apparent from an examination of the specification and claims that follow.

SUMMARY OF THE INVENTION

In accordance with this invention, it has been found that carbonic acid esters, as described herein, can be used to achieve excellent lubrication of magnetic recording layers without significantly deleteriously effecting the recording characteristics of such layers. The carbonic acid esters employed for this purpose have the formula:

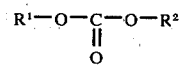

where $R^1$ is aryl or alkyl, $R^2$ is alkyl and the carbonic ester contains at least 13 carbon atoms. Typical esters include phenyl cetyl carbonate, lauryl ethyl carbonate, dioctyl carbonate, cetyl ethyl carbonate, and the like.

DESCRIPTION OF THE PREFERRED EMBODIMENTS

The present invention includes a magnetic recording element comprising a non-magnetic support and a layer containing (1) magnetic particles dispersed in a binder and (2) about 1 to about 40 percent, by weight, based on binder, of a carbonic acid ester lubricant having the formula:

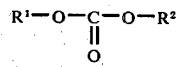

where $R^1$ is aryl or alkyl and $R^2$ is alkyl, said ester containing at least 13 carbon atoms.

Suitable carbonic acid ester lubricants that can be employed in the practice of this invention contain at least 13 carbon atoms, generally 13 to 33 carbon atoms. Typical $R^1$ aryl radicals are derived from mono- or polynuclear aromatic hydrocarbons and include, for example, phenyl, tolyl, naphthyl, anthryl, and the like. Typical $R^1$ and $R^2$ alkyl radicals are straight or branched chain and include, for example, ethyl, pentyl, octyl, decyl, lauryl, dodecyl, cetyl, and the like. Suitable alkyl radicals present in the carbonic acid esters employed in practicing this invention do not need to be substituted with non-hydrocarbon substituents. However, alkyl radicals containing non-hydrocarbon substituents which would not deleteriously effect the required lubricating characteristics of the carbonic acid ester and which would give results equivalent to those of alkyl radicals which are hydrocarbons and contain no such substituents could be present. Such non-hydrocarbon substituents could include halogen atoms such as chlorine or fluorine as well as ether or ester radicals. Where each of $R^1$ and $R^2$ is alkyl at least one of these alkyls can be preferably a longer chain alkyl if the carbonic acid ester is to contain the required minimum 13 carbon atoms. Typical longer chain alkyls contain at least 10 carbon atoms, generally 10 to about 16 carbon atoms.

According to an embodiment of the invention, there can be used a carbonic acid ester having the formula:

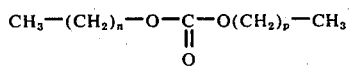

wherein $n$ and $p$ are whole numbers such that the sum $n + p$ is in the range of 10 to 30. It is also advantageous to use carbonic acid esters having this formula wherein $n$ is equal to $p$ and is in the range of 5 to 15, i.e. symmetrical carbonic acid esters wherein the alkyl radicals are identical and contain 6 to 16 carbon atoms.

According to another embodiment of this invention, there can be used a carbonic acid ester having the formula:

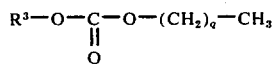

wherein $R^3$ is aryl such as phenyl, etc. and $q$ is a whole number equal to at least 9.

The use of the magnetic layer according to the invention is particularly advantageous for video recording tapes and for data processing tapes, but it also is advantageous for sound-recording tapes, particularly in the cases where the layer is submitted to very severe conditions of use, whether due to repeated passages as in language laboratories, or due to high stresses or to the particular profile of the heads, as for 16 mm or 35 mm perforated tapes.

The increased resistance to wear and tear of the elements for magnetic recording of this invention influences not only the useful lifetime of the element but also the quality of the reproduction in the case of image recording or sound recording, and the dependability of the magnetic memory in its use for handling information.

The carbonic acid esters useful for the embodiment of the invention advantageously comprise mixed aliphatic carbonic acid esters such as ethyl lauryl carbonate, ethyl cetyl carbonate, etc. symmetrical aliphatic carbonic acid esters such as didodecyl carbonate, etc. and aliphatic aromatic mixed esters such as cetyl phenyl carbonate, etc.

The carbonic acid esters used in practicing this invention can be prepared by any suitable process. In one such process, they are prepared from well defined products according to the method indicated hereinafter. This method results in the preparation of relatively pure compounds and avoids the aforeindicated disadvantages for fatty acid esters and monoalcohols such as are described in the afore-cited U.S. Pat. No. 3,274,111. This method comprises reacting alkyl or aryl chloroformate, in the presence of a base such as pyridine, with an appropriate linear or branched saturated aliphatic alcohol. The ester obtained is purified, e.g. through distillation.

Amounts of lubricant between approximately 1 and 40%, by weight, of binder in the magnetic recording layer are suitable for practicing the present invention, and the amount is advantageously approximately 20%.

According to the invention, the lubricant is introduced into the magnetic layer at any stage whatsoever of the preparation of the layer. It can be incorporated with the dope of the binder, with the paste formed by the magnetic substance and the solvent, or with the completed dispersion of the magnetic substance in the binder. The lubricant can also be introduced into the dry magnetic layer after applying the layer to the support, i.e. to the already manufactured magnetic tape, and it is then advantageous to dilute the lubricant with a compound that does not dissolve the layer, which allows in corporation by imbibition or spraying.

The binders used in this invention are, in particular, vinyl acetate vinyl chloride copolymers, vinylidene chloride acrylonitrile copolymers, acrylic and/or methacrylic ester copolymers; polyvinyl butyral; butadiene styrene copolymers; acrylonitrile vinylidene chloride maleic anhydride terpolymers; cross-linked or uncross-linked copolycondensates such as polyamides, polyurethanes, polyesters, etc.; or mixtures of these binders. Advantageous results are obtained by using a partially hydrolized vinyl acetate vinyl chloride, copolymer, possibly cross-linked by diisocyanate or a polyisocyanate, or by using polyurethanes; or else a mixture of these binders; the amount of binder with respect to magnetic oxide being in the range of about 15% to about 40%, by weight.

The magnetic recording element according to the invention can contain additives such as oleic acid or any other dispersing agent in order to facilitate the dispersion; conductive pigments such as carbon in order to avoid static and fillers such as alumina or colloidal silica without change in the characteristics that are desired.

The magnetic substance in the magnetic recording layer or layers described herein is advantageously acicular gamma ferric oxide (gamma $Fe_2O_3$). The lubricants according to the invention described herein are particularly useful when the length of such ferric oxide particles is relatively small, e.g. from $0.3\mu$ to $0.4\mu$, since magnetic layers are less resistant to friction as the sizes of the crystals which form it are smaller. However, the invention is applicable to magnetic elements such as tapes regardless of the morphology and the size of the crystals that are used, and the tapes may also contain in place of ferric oxide any other magnetic substance, such as chrominum dioxide, ferrites, particles of metal alloys, etc.

A magnetic layer according to the invention can be applied to any suitable support, including thin films such as cellulose triacetate supports, polyvinyl chloride, or polyester such as poly(ethylene terephthalate), etc. Such a layer can also be coated on any other surface.

The surfaces of the magnetic tapes of this invention are particularly smooth, and the abrasiveness of said tapes with respect to reproducing heads is clearly diminished compared with a magnetic composition which does not contain a lubricant according to the invention.

The invention is further illustrated by the following examples of its practice.

EXAMPLE 1

In a three-necked flask provided with a thermometer, a stirrer and a dropping funnel, one dissolves 242 g of cetyl alcohol in 450 ml of distilled toluene by warming up to 35° C. One adds to it 90 g of pyridine (i.e. an excess of 20%) and one introduces into the mixture, drop by drop, by means of a dropping funnel 115 g of ethylchloroformate (i.e. an excess of 8%). The solution becomes cloudy because of the precipitation of pyridine hydrochloride while the temperature increases. The temperature is kept at 40°–45° C, by cooling with a cold water bath, during the introduction of ethyl chloroformate. One holds for one more hour at 40°–45° C, then cools to room temperature and dissolves the pyridine hydrochloride in 100 ml of water. One neutralizes the excess of pyridine with 10% hydrochloric acid, washes with water, and decants and dries the toluene solution. One removes the toluene by means of distillation and purifies by means of distillation under reduced pressure the mixed carbonate that has formed according to the reaction:

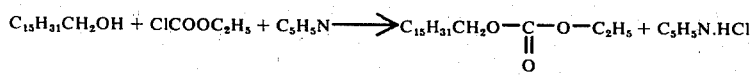

One incorporates 8 g of thusly prepared cetyl ethyl carbonate in 1 kg of magnetic dispersion, the dry extract of which comprises essentially 300 g of acicular ferric oxide and 80 g of binder consisting of 90% of a vinyl chloride-vinyl acetate copolymer sold by the Rhone-Poulenc Company under the name Rhodopas AX and 10% of butadiene-acrylonitrile copolymer sold by the BF Goodrich Company under the name Hycar 1432.

One homogenizes and filters, then coats the dispersion on a poly(ethylene terephthalate) support in order to deposit a layer 8 to 10 microns thick in the dry state.

One calenders the dry layer between polished cylinders and cuts from it tapes 25.4 mm wide.

One places one of the thusly prepared tapes on a magnetoscope with helicoidal scanning. After recording, one proceeds with still frame reading. It continues for over an hour with no change of the image whereas the image of a similar test sample without lubricant changes and disappears after a few seconds of operation.

EXAMPLE 2

One introduces into a porcelain jar, provided with steel balls 8 mm in diameter, 150 g of acicular magnetic ferric oxide $Fe_2O_3$, with 140 ml of methylisobutylketone and 5 g of oleic acid. After a 24 hour dispersion, one adds to this paste a collodion obtained by dissolving in methylisobutylketone 45 g of a copolymer containing 77% by weight of vinylidene chloride, 20% of acrylonitrile, and 3% of maleic anhydride, with which one incorporates 6 g of lauryl ethyl carbonate. After homogenizing for 24 hours, one uses the dispersion to prepare a magnetic tape as described in Example 1. Its lifetime, established as indicated in the preceeding example, surpasses 1 hour, whereas with the test sample, without carbonic ester, the image disappears within a few minutes.

EXAMPLE 3

In a 1 liter three-necked flask containing 300 ml of toluene, 121 g of cetyl alcohol are dissolved by heating up to 35° C. One adds 80 g of pyridine, then, drop by drop, with stirring, 82 g of phenyl chloroformate. One keeps the temperature at approximately 40° C for 4 hours. One destroys the excess of chloroformate with a few drops of ethyl alcohol and then pours the reaction product into 200 ml of distilled water wherein the pyridine hydrochloride that is formed is dissolved. One neutralizes the excess of pyridine by means of hydrochloric acid, washes the toluene solution with water and removes the toluene by means of distillation. One recrystallizes the residue in ethyl alcohol and obtains the mixed cetyl phenyl carbonate.

One adds 8 g of this compound to a collodion obtained by dissolving in methylisobutylketone 37.5 g of a partially hydrolized vinyl chloride-vinyl acetate copolymer sold by the Phone-Poulenc Company under the name Rhodopas AXRH. One mixes this collection with a paste prepared by the dispersion in a 1 liter jar of 150 g of acicular gamma ferric oxide $Fe_2O_3$ in 140 ml of methylisobutylketone along with 5 g of oleic acid.

One prepares the magnetic tape and it is evaluated as indicated in the preceding examples. The tape makes it possible to reproduce the same image for a period of time exceeding 1 hour.

EXAMPLE 4

One introduces into a 1 liter procelain jar containing 2 kg of steel balls having an average diameter of 8 mm, 150 g of gamma ferric oxide $Fe_2O_3$ and the collodion obtained by dissolving 10 g of Rhodopas AXRH resin, already mentioned in Example 3, in 160 ml of methylisobutylketone.

After 72 hours of dispersion, one adds a collodion of the following composition:

| | |
|---|---|
| Methylisobutylketone | 100 ml |
| Cyclohexanone | 20 ml |
| Rhodopas AXRH | 5 g |
| Estane 5715 | 15 g |
| Didodecyl carbonate | 7.5 g |

The Estane 5715 product is a soluble polyurethane resin sold by the BF Goodrich Company.

The didodecyl carbonate is obtained by reacting phosgene or lauryl chloroformate with lauric alcohol.

After having homogenized for 24 hours, one adds while stirring 10 g of polyisocyanate Desmodur L, a product sold by the PBU Company and which results from the reaction of three molecules of toluene diisocyanate with 1 molecule of trimethylol propane.

One uses the ferric oxide suspension for preparing a tape as is described in Example 1. One stores the tape for several days in order to make possible the completion of the cross-linking reaction. The cross-linkage can be accelerated by raising the temperature and/or by the addition to the oxide suspension of a catalyst such as, e.g. a tertiary amine, at the moment of coating of the support.

The thusly obtained tape is evaluated under the same conditions as those indicated in the preceding examples. The same track can be explored for over an hour without significant change of the image.

EXAMPLE 5

150 g of an acicular magnetic iron oxide $Fe_2O_3$ and a dope obtained by dissolving 15 g of a partially hydrolyzed vinyl chloride-vinyl acetate copolymer (sold by the Rhone-Poulenc Co. as Rhodopax AXRH) in 200 ml of methylisobutylketone, were introduced into a porcelain jar containing 2 kg of steel balls having an average diameter of 8 mm. After 72 hours of dispersion a dope containing 20 g of Rhodopas AXRH, 120 ml of methylisobutylketone and 7 g of didecyl carbonate were added. After being homogenized for 24 hours, the resulting oxide suspension was used to prepare a magnetic tape as described in Example 1. The tape was tested as in Example 1 and the image did not change after more than 1 hour of operation, whereas the image in a control tape containing no ester disappeared after only a few minutes time.

Didecyl carbonate was substituted by dioctyl carbonate in the above procedure. A similar improvement with respect to wear resistance was obtained.

EXAMPLE 6

As previously indicated, the result obtained using a particular material as a lubricant in a magnetic recording layer is unpredictable. To illustrate, the following four runs were made:

Run A — 8 g of di(2-ethylhexyl)azelate (sold by Pfizer under the name Morflex 410) were introduced into one kg of magnetic dispersion which dispersion was then coated and tested on a magnetoscope, all as described in Example 1. After only a few minutes, the image disappeared and the recording head showed a significant buildup of residue from the tape.

Run B — 8 g of silicone oil (sold by Rhone-Poulenc under the name Huile X58) were substituted for the di(2-ethylhexyl)azelate in Run A. The tests on the magnetoscope disclosed no improvement in lubrication in comparison to a control which contained no lubricant.

Run C — 8 g of didecyl oxalate were substituted for the di(2-ethylhexyl)azelate in Run A. Upon testing on the magnetoscope the recorded image disappeared after only a few minutes of scanning.

Run D — 8 g of a commercially available dibutyl carbonate (sold by the Baker Chemical Co.) were substituted for the di(2-ethylhexyl)azelate in Run A. Upon testing as in Run A, no improvement in lubrication was obtained as compared to a control that did not contain this ester.

It can be seen from the above runs that a known lubricant such as a silicone oil, organic esters, and even a carbonic acid ester, but not of the class employed in the practice of this invention, all fail in providing adequate lubrication without deleteriously effecting the recording characteristics of a magnetic layer.

The invention has been described in detail with particular reference to preferred embodiments thereof, but it will be understood that variations and modifications can be effected within the spirit and scope of the invention.

I claim:

1. A magnetic recording element comprising a nonmagnetic support and a layer containing (1) magnetic particles dispersed in a binder and (2) about 1 to about 40 percent, by weight, based on binder, of a carbonic acid ester lubricant having the formula:

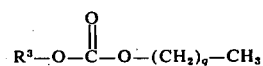

where $R^3$ is phenyl and q is a whole number of at least 9, said ester containing at least 13 carbon atoms.

2. A magnetic recording element comprising a nonmagnetic support and a layer containing (1) magnetic particles dispersed in a binder and (2) about 1 to about 40 percent, by weight, based on binder, of a carbonic acid ester lubricant having the formula:

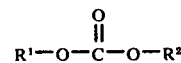

where $R^1$ is ethyl and $R^2$ is alkyl, said ester containing at least 13 carbon atoms.

3. A magnetic recording element comprising a nonmagnetic support and a layer containing (1) magnetic particles dispersed in a binder and (2) about 1 to about 40 percent, by weight, based on binder, of a carbonic acid ester lubricant, said carbonic acid ester being ethyl cetyl carbonate, ethyl lauryl carbonate, dioctyl carbonate, didecyl carbonate or didodecyl carbonate.

4. An element according to claim 3 in which said binder comprises a partially hydrolized vinyl acetate vinyl chloride copolymer cross-linked with a polyisocyanate.

5. A magnetic recording element comprising a nonmagnetic support and a layer containing (1) magnetic particles dispersed in a binder and (2) about 1 to about 40 percent, by weight, based on binder, of a carbonic acid ester lubricant, said carbonic acid ester being phenyl cetyl carbonate.

6. A magnetic recording element comprising a nonmagnetic support and a layer containing (1) magnetic particles dispersed in a binder and (2) about 1 to about 40 percent, by weight, based on binder, of a carbonic acid ester lubricant, said carbonic acid ester being ethyl cetyl carbonate.

* * * * *

UNITED STATES PATENT AND TRADEMARK OFFICE
CERTIFICATE OF CORRECTION

PATENT NO. : 3,987,232
DATED : October 19, 1976
INVENTOR(S) : A.P. Huguenard, Y.P.M. Etienne, C.A.R. Magallon It is certified that error appears in the above-identified patent and that said Letters Patent are hereby corrected as shown below:

Title page, between items [63] and [52] add, as a new entry ---[30] Foreign Application Priority Data June 29, 1970 France........7023983---.

Column 4, line 18, change "in corporation" to ---incorporation---.

Column 6, line 21, change "Phone" to ---Rhone---.

Column 6, line 22, change "collection" to ---collodion---.

Signed and Sealed this

Eleventh Day of January 1977

[SEAL]

Attest:

RUTH C. MASON
*Attesting Officer*

C. MARSHALL DANN
*Commissioner of Patents and Trademarks*